United States Patent [19]

Otto

[11] 4,399,998
[45] Aug. 23, 1983

[54] SELF-VENTING SEAL LIP

[75] Inventor: Dennis L. Otto, Malvern, Ohio

[73] Assignee: The Timken Company, Canton, Ohio

[21] Appl. No.: 334,740

[22] Filed: Dec. 28, 1981

[51] Int. Cl.³ .............................................. F16J 15/32
[52] U.S. Cl. ..................................... 277/134; 277/153
[58] Field of Search ......................... 277/29, 134, 153

[56] References Cited

U.S. PATENT DOCUMENTS

| 3,501,155 | 3/1970 | Dega et al. | 277/134 |
| 3,572,732 | 3/1971 | Sekulich | 277/153 |
| 3,586,342 | 6/1971 | Staab | 277/134 |
| 3,895,814 | 7/1975 | Kupfert | 277/134 |
| 4,084,826 | 4/1978 | Vossieck | 277/134 |
| 4,174,845 | 11/1979 | Hadaway | 277/134 |
| 4,183,543 | 1/1980 | Antonini | 277/134 |
| 4,344,631 | 8/1982 | Winn | 277/29 |

FOREIGN PATENT DOCUMENTS

| 970407 | 7/1975 | Canada | 277/134 |
| 1196451 | 6/1970 | United Kingdom | 277/134 |
| 1252911 | 11/1971 | United Kingdom | 277/134 |

Primary Examiner—Robert I. Smith
Attorney, Agent, or Firm—Gravely, Lieder & Woodruff

[57] ABSTRACT

An elastomeric seal lip contacts a cylindrical wear surface along a sealing edge formed by the convergence of two conical surfaces on the seal lip, and accordingly a region behind the seal lip is isolated. On the conical surface that is presented away from the isolated region, the seal lip is provided with embossments that project toward, but normally do not contact the wear surface. However, when the seal lip is distorted by an increase in pressure within the isolated region, the embossments contact the wear surface and serve as fulcrums, enabling the entire lip to pivot sufficiently to lift the sealing edge away from the wear surface. This vents the isolated region and allows the seal lip to return to its normal configuration. The embossments may also function as elastohydrodynamic pumping elements.

16 Claims, 21 Drawing Figures

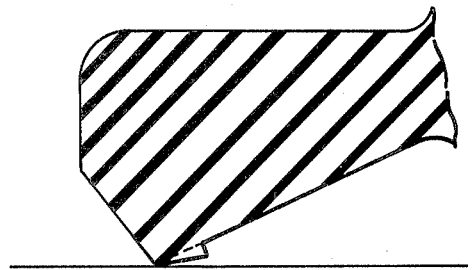
FIG. 1 Prior Art - Normal operating configuration
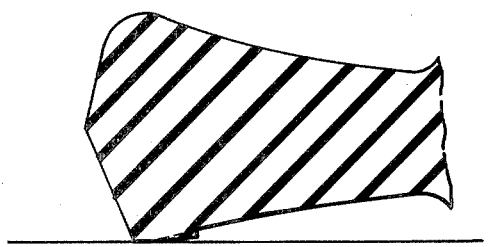
FIG. 2 Prior Art - Configuration at elevated pressures
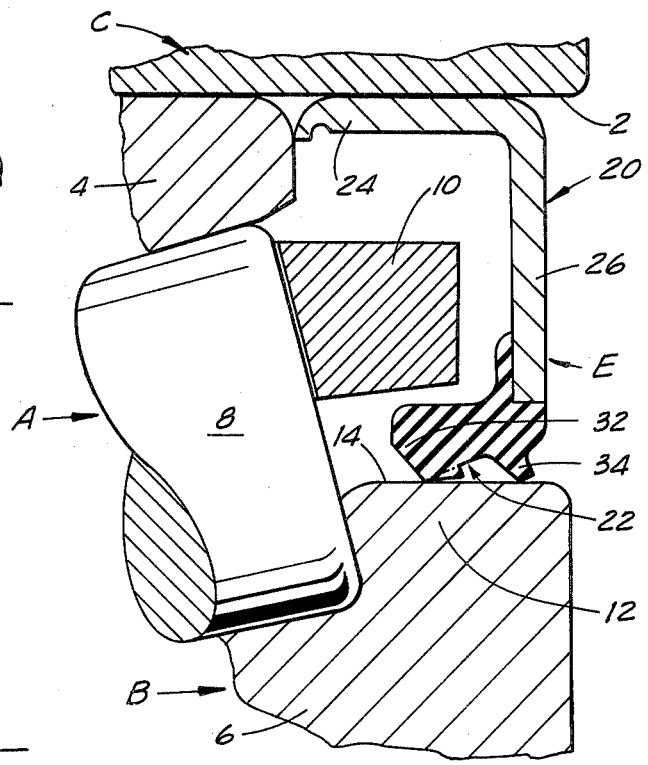
FIG. 3
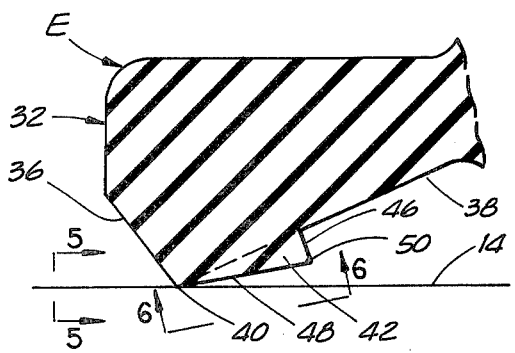
FIG. 4
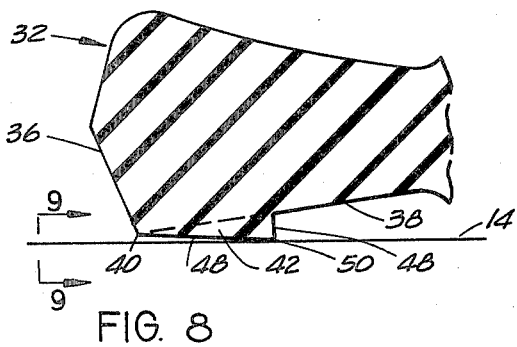
FIG. 8
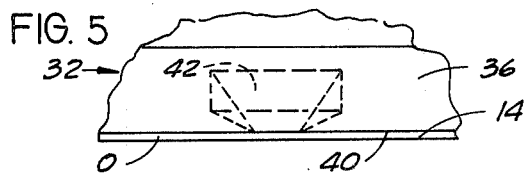
FIG. 5
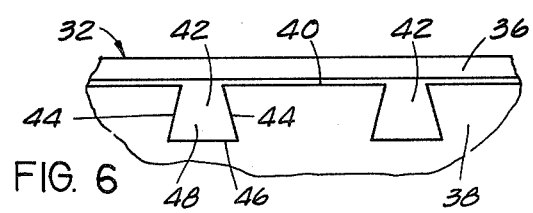
FIG. 6
FIG. 9
FIG. 7
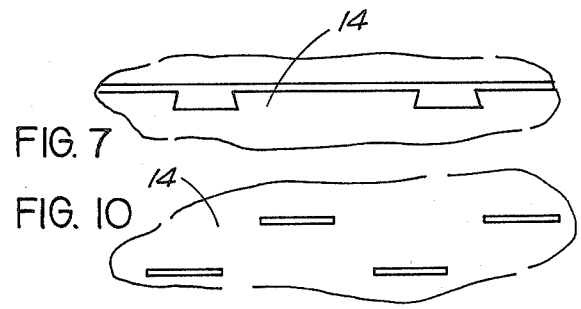
FIG. 10

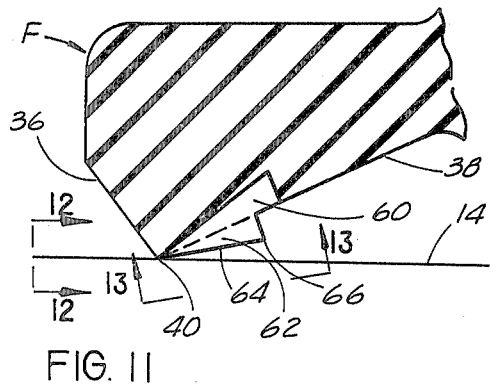
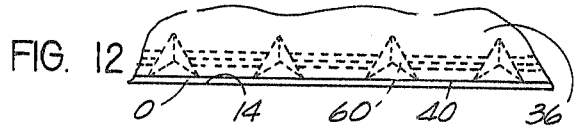
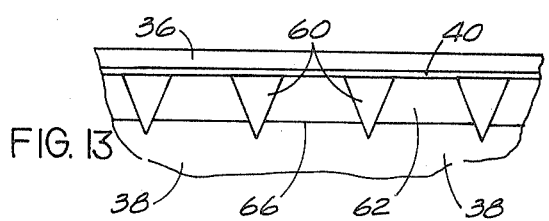
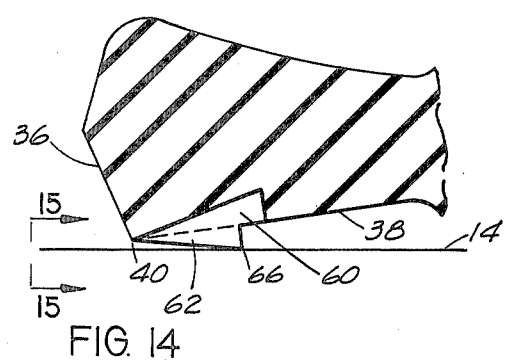
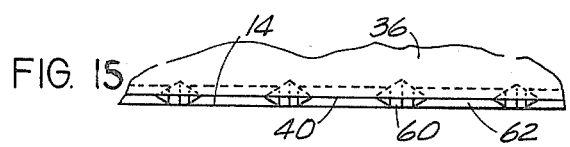
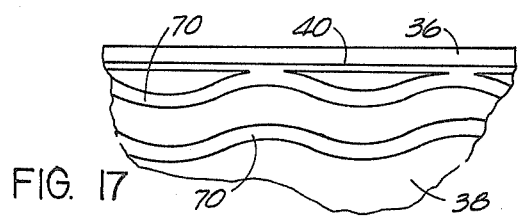
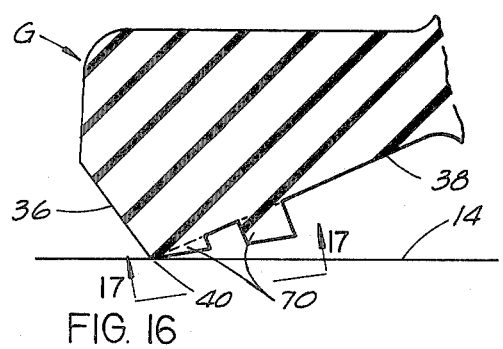
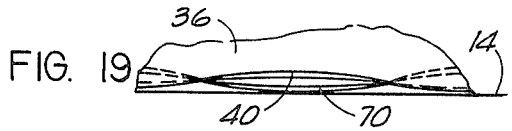
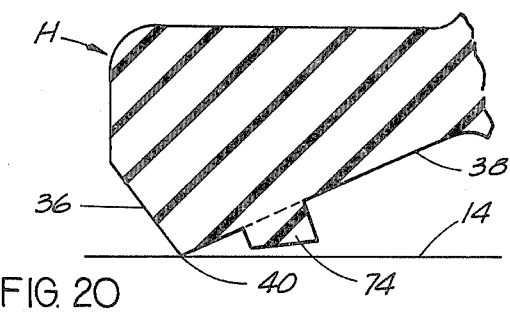
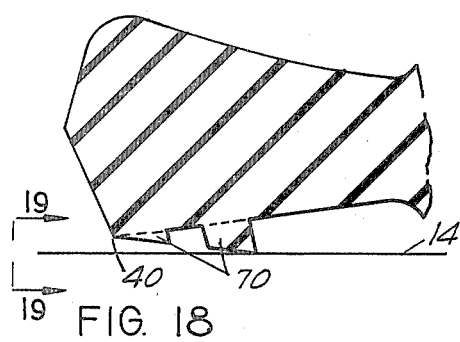
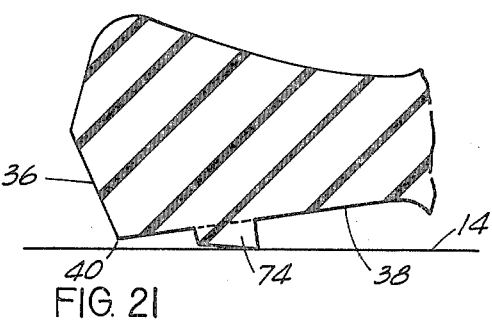

SELF-VENTING SEAL LIP

BACKGROUND OF THE INVENTION

This invention relates in general to seals and more particularly to lip seals that have the capability of venting the spaces isolated by them.

Radial lip seals are commonly used in conjunction with antifriction bearings and when other interfaces in the bearing assembly are closed, the seals will isolate the space occupied by the rolling elements and raceways of the bearing so that lubricants will be contained within that space while contaminants will be excluded from it. Indeed, the automotive industry makes extensive use of lip seals in the wheels of both front wheel drive and rear wheel drive automobiles. Many of the seals of current manufacture employ elastohydrodynamic sealing mechanisms, which means that they have special configurations which pump any lubricant that passes under the seals back toward the spaces enclosed by the seals. In the typical seal, these special configurations are triangular, but they may also be sinusoidal or wave-like.

In any event, seals of current construction are perhaps too effective, at least when operating under elevated pressures within the sealed region. In this regard, the typical radial lip seal, despite its name, has a lip which extends generally axially over a wear surface against which it seals, and contacts that surface along a radially directed extension of the lip (see FIG. 1). An oil film normally exists between the lip and the wear surface. Usually the normal resiliency of the elastomer from which the seal lip is formed is sufficient to maintain the seal lip against the wear surface, but in larger seals, such as the type used with railroad bearings, springs are employed to insure that continous contact exists between the seal lip and the wear surface. Should the pressure increase in the space isolated by the seal, that is within the interior of the bearing as could well occur if the bearing operates at elevated temperatures, the increased pressure will exert an inwardly directed force on the axial portion of the seal lip and cause the lip to press even tighter against the wear surface (see FIG. 2). Thus, the space isolated by the seal remains at the elevated pressure.

To overcome this problem, some seals include vents, but small seals of the type used in automobiles often do not have enough unobstructed surface area to accommodate an effective vent. Furthermore, seals with vents incorporated into them must be oriented correctly, usually with the vent presented upwardly, in order to avoid loosing the lubricant through the vent under elevated pressures. Also, some vents remain open continously, and as a consequence the lubricant may leak from them even during normal operating conditions, or contaminants such as dust and water may be drawn in through them.

SUMMARY OF THE INVENTION

One of the principal objects of the present invention is to provide a lip seal that has the capability of venting the region isolated by the seal, with the venting occurring along the sealing edge of the seal. Another object is to provide a seal of the type stated in which the venting only occurs during conditions of elevated pressure within the isolated region, and then only long enough to relieve the pressure within the region. A further object is to provide a seal of the type stated which utilizes the natural distortion of the seal to effect the venting. An additional object is to provide a seal of the type stated which is ideally suited for use in connection with the wheel bearings of automotive vehicles. These and other objects and advantages will become apparent hereinafter.

The present invention is embodied in a seal unit that includes a mount and a seal lip that is attached to the mount and projects over a wear surface. The seal unit contacts the wear surface along a sealing edge and adjacent to the sealing edge is provided with pivot means, which when the seal lip is distorted by elevated pressures within the area isolated by it, serve as pivot points about which the lip pivots to lift the sealing edge of the wear surface and thereby vent the isolated region. This invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

FIG. 1 is a sectional view of a conventional seal lip having elastohydrodynamic configurations adjacent to its sealing edge for directing lubricant that has escaped past that edge back to the edge, the seal being illustrated in its normal operating configuration;

FIG. 2 is a sectional view similar to FIG. 1 but showing the conventional seal lip distorted under a high pressure within the region isolated by the seal lip;

FIG. 3 is a sectional view of a seal unit of the present invention used in conjunction with a tapered roller bearing;

FIG. 4 is an enlarged sectional view of a seal lip for the seal unit of FIG. 3, the lip being illustrated in the configuration that it assumes under normal operating conditions;

FIG. 5 is an elevational view of the seal lip taken along line 5—5 of FIG. 4;

FIG. 6 is a view of the back side of the seal lip taken along line 6—6 of FIG. 4;

FIG. 7 is a plan view of the wear surface showing the so-called footprint left by the seal lip of FIG. 4 under normal operating conditions;

FIG. 8 is an enlarged sectional view of the seal lip when distorted by high pressure within the area isolated by the seal unit, the seal lip being in its self-venting position;

FIG. 9 is an elevational view of the distorted seal lip taken along line 9—9 of FIG. 8;

FIG. 10 is a plan view of the wear surface showing the footprint made by the seal when in its distorted venting condition;

FIG. 11 is a sectional view of a modified seal lip under normal operating conditions, the seal lip having its elastohydrodynamic pumping configurations in the form of triangular pockets;

FIG. 12 is an elevational view of the seal of FIG. 11 taken along line 12—12 of FIG. 11;

FIG. 13 is a view of the back side of the modified seal lip of FIG. 11 taken along line 13—13 of FIG. 11;

FIG. 14 is an enlarged sectional view of the modified seal lip of FIG. 11 distorted under pressure to the extent that it is self-venting;

FIG. 15 is an elevational view of the modified seal lip of FIG. 11 taken along line 15—15 of FIG. 14 and showing the lip in its vented condition;

FIG. 16 is a sectional view of another modified seal lip in its normal operating configuration, the lip having its elastohydrodynamic elements in the form of wavelike ribs;

FIG. 17 is a view of the back side of the other modified seal lip taken along line 17—17 of FIG. 16;

FIG. 18 is a sectional view of the seal lip of FIG. 16, with the lip being deformed under pressure to the extent that it is self-venting;

FIG. 19 is an elevational view of the seal lip of FIG. 16 taken along line 19—19 of FIG. 18 and showing the lip in its vented condition;

FIG. 20 is an enlarged sectional view of still another modified seal having a plain seal lip and buttons located remote from that lip; and FIG. 21 is a sectional view of the seal of FIG. 20 distorted under pressure to the extent that it is self-venting.

DETAILED DESCRIPTION

Referring now to the drawings (FIG. 3), an assembly A includes an antifriction bearing B that fits within a housing C, such as a wheel hub, and over a shaft (not shown), such as wheel spindle, to enable the housing C to rotate freely with respect to a shaft or vice-versa. Each end of the assembly A is closed by a seal unit E to prevent a lubricant that is within the bearing B from escaping and to further prevent contaminants, such as dust and water, from entering the interior of the bearing B. The seal unit E possesses the capability of venting the enclosed region.

The bearing B fits within the housing C which contains a bore 2 that receives the bearing B. Typically, the bearing B is a tapered roller bearing having a cup 4 (FIG. 3) that fits snugly into the housing bore 2, a cone 6 that is located within the cup 4 and fits around the shaft, tapered rollers 8 arranged in a single row between raceways on the cup 4 and cone 6, and a cage 10 to maintain the correct spacing between the tapered rollers 8. By reason of the tapered geometry in the cup 4, cone 6, and rollers 8, a radial load transmitted through the bearing B will at the rollers 8 resolve into an axial component which urges the rollers 8 toward the large ends of the raceways for the cup 4 and cone 6. To prevent the rollers 8 from being expelled from the space between the cup 4 and cone 6, the cone 6 is provided with a thrust rib 12 that projects outwardly from the large diameter end of the cone raceway and serves as an abutment against which the large diameter ends of the tapered rollers 8 bear. The thrust rib 12 extends out to the back face of the cone 6 and has a cylindrical surface 14 that is presented outwardly, and is located axially beyond the front face of the cup 4, yet is within the housing bore 2 which extends beyond the front face of the cup 4. The cylindrical surface 14, like the remaining surface of the cone 6, is case hardened and serves as a wear surface for the seal unit E.

The seal unit E fits into the housing bore 2 immediately beyond the cup 4 and extends radially inwardly to the thrust rib, which it contacts, so as to form a substantially fluid-tight barrier along the wear surface 14 and housing bore 2. More specifically, the seal unit E includes (FIG. 3) a rigid seal case 20 and a flexible seal element 22 that is bonded to the seal case 20 near the inner margin of the cases 20 such that it contacts the cylindrical wear surface 14 of the cone 6. The seal case 20 is preferably stamped from a suitable metal such as sheet steel, and includes an axial wall 24 and a radial end wall 26. The outside diameter of the axial wall 24 is only slightly greater than the diameter of the housing bore 2, and the axial wall 24 is pressed into the housing bore 4 where it remains in place by virtue of the interference fit. This also establishes a fluid-tight seal between the housing bore 2 and the seal case 20. When the axial wall 24 is inserted fully its end may or may not bear against the front face of the cup 4. The unit E should be located with an installation tool so that the radial wall 26 will align with, or perhaps be set slightly inwardly from the back face of the cone 6.

The seal element 22 is preferably molded from an elastomer and during the molding operation is bonded to the radial wall 26 of the seal case 20. The seal element includes (FIG. 3) two lips that are molded integral with each other, namely—a seal lip 32 that extends axially toward the rollers 8 and a dust lip 34 that extends outwardly and downwardly away from the rollers 8. Both lips 32 and 34 contact the cylindrical wear surface 14 on the thrust rib 12 of the cone 6.

The seal lip 32 extends axially from the radial wall 26 of the seal case 20 and is to a large measure generally parallel to the cylindrical surface 14. Indeed, during normal operating conditions (FIGS. 4–7) its outwardly presented surface is for the most part cylindrical, just like the cylindrical surface 14 or the thrust rib 12 for the cone 6. The inwardly presented face of the seal lip 32 is formed by a pair of conical surfaces 36 and 38 which converge toward a sealing edge 40. The conical surface 36 is presented toward the interior of the bearing B and when the seal lip 32 is not distorted it is inclined at about 60° with respect to the axis of the bearing B. The conical surface 38 faces in the opposite direction, and under normal operating conditions is inclined at between 20° and 30° with respect to the axis of rotation. The sealing edge 40 is very narrow, yet continuous for the entire circumference of the lip 32, and indeed the lip 32 contacts the cylindrical wear surface 14 along the full circumference of the edge 40. Actually, during normal operating conditions, a thin film of oil o (FIG. 5) exists between the sealing edge 40 and the cylindrical wear surface 14, so the edge 40 does not in a strict sense come directly into contact with the wear surface 14.

In addition to the two conical surfaces 36 and 38 and the sealing edge 40, the seal lip 32 has elastohydrodynamic pumping elements 42 (FIGS. 4–6) which are in effect embossments of generally triangular shape that project from the conical surface 38 adjacent to the sealing edge 40. Actually, the pumping elements 42 are perhaps more trapezoidal in configuration than triangular, with each having its inclined margins presented oblique to the edge 40 and its parallel margins parallel to the edge 40. Moreover, the shorter of the two parallel margins is coincident with the sealing edge 40. More specifically, each pumping element 42 includes two planar side faces 44 which are perpendicular to the conical surface 38 and converge toward the sealing edge 40, intersecting the sealing edge 40 such that the inclined angles between the two side faces 44 and the edge 40 are equal. The inclined angles should range between 10° and 60° and should preferably be about 30°. The side faces 44 extend out to a back face 46 which is presented toward the dust lip 34. The two side faces 44 together with the back face 46 and the sealing edge 40 define a bottom face 48 that is presented toward the cylindrical wear surface 14 on the cone 6. The bottom face 48 may be generally planar or slightly concave with its curvature corresponding to the underlying wear surface 14. In any event, the bottom face 48 at its leading margin merges into the sealing edge 40 and of course at that end possesses the same circular shape as the sealing edge 40. The opposite margin of the bottom face 48, however, is spaced from the conical surface 38, and forms a pivot edge 50 about which the entire seal lip will rock or pivot. Owing to the presence of the back face 46, the bottom face is disposed inwardly from the conical surface 38 with the angle between the bottom face 48 and the underlying surface 14 being between 3° and 15° and preferably about 5°. As a consequence the side faces 44 of the element 42 are triangular, and thus impart a wedge shaped cross-sectional configuration to the entire pumping element 42 (FIG. 4). The side faces 44, being included with respect to the sealing edge 40 and the direction of relative movement between the seal lip 32 and wear surface 14, serve as deflecting surfaces for pumping any lubricant that escapes past the sealing edge 40 back toward the sealing edge 40. The particular faces 44 which do the pumping are, of course, dependent on the direction of the relative movement between the seal lip 32 and the cylindrical wear surface 14.

The so-called footprint left by the seal on the cylindrical surface 14 during normal operating conditions is a narrow band enlarged at equal intervals by projections away from the sealed region (FIG. 7). The band represents the area supporting the sealing edge 40, while projections represent the additional area that supports the nearby portions of the pumping elements 42.

Unlike conventional elastohydrodynamic seals, the seal element 22 will vent the interior of the bearing B if the pressure within the bearing B exceeds a predetermined magnitude, this being by reason of the fact that the pumping elements 42 lie much closer to the wear surface 14 than would the pumping elements of a conventional seal. In particular, as the pressure within the bearing B increases, it exerts a radially inwardly directed force on the seal element 22. This causes the seal element 22 to deflect where it is thinnest, which is the region where the seal lip 32 merges into the dust lip 34, and as a consequence, the seal lip 22 assumes a somewhat different configuration (FIGS. 8-10). In particular, the outwardly presented surface of the seal lip 32, instead of maintaining a cylindrical configuration, bows inwardly, and the entire lip 32 rocks backwardly on the sealing edge 40. Indeed, the entire bottom faces 48 of the pumping elements will in time come against the wear surface 14. A slight increase in pressure beyond this point causes the seal lip 32 to deform even further and instead of pivoting about the sealing edge 40, it now pivots about the back or pivot edges 50 of the pumping elements 42. This raises the forward portion of each pumping element 42 off of the wear surface 14 and likewise lifts the adjacent portions of the sealing edge 40 (FIGS. 8 and 9). Consequently, any trapped air escapes under the elevated portions of the sealing edge 40.

The footprint for the seal lip 32 in its self-venting condition is a series of circumferentially spaced bands arranged in two rows with the bands of the rows alternating (FIG. 10). The row of bands closest to the sealed region represents the segments of the sealing edge 40 that are supported by the cylindrical surface 14, while the other row represents areas of support for the pivot edges 50 on the pumping elements 42.

Once the pressure within the bearing B is relieved, the seal lip 32 returns to its original shape, in which case the lip 32 again contacts the wear surface 14 along the full circumference of the sealing edge 40, and the bottom faces 48 of the pumping elements 42 are withdrawn from the wear surface 14.

Other types of elastohydrodynamic seal units as well as plain lip seals may likewise be provided with self-venting characteristics. For example, a seal unit F (FIGS. 11-15) is similar in many respects to the seal unit E, except that its seal lip 32 does not have pumping elements 42 that project outwardly. Instead, the seal lip 32 has triangular pockets 60 (FIGS. 11 and 13) that open out of conical surface 38 adjacent to the sealing edge 40, with the apexes of the pockets 60 being located away from the sealing edge 40 and the side walls of the pockets 60 being oblique to the edge 40. Thus, the lubricant that escapes past the sealing edge 40 will be deflected by one or the other of the side walls for each triangular pocket 60 such that it is directed back to the sealing edge 40 where it again becomes part of the elastohydrodynamic oil film o. The regions between the pockets 60 are occupied embossments 62 that project from the conical surface 38 and the bottom surfaces 64 which are below the conical surface 38 and indeed are inclined at between 3° and 15° with respect to the axis of rotation and are preferably at 5°. One end of each embossment 62 merges into the sealing edge 40 and is flush with it, while the opposite end terminates at a pivot edge 66 which is located ahead of, that is closer to the sealing edge 40, than the adjacent ends of the pockets 60. The side faces of the embossments 62 form continuations of the side walls of the pockets 60.

An increase in pressure within the bearing B will distort the seal lip 32 and bring the bottom faces 64 of the embossments 62 against the wear surface 14. Further distortion will cause the seal lip to rock backwardly on the rear or pivot edges 66 of the embossments 62 (FIG. 14). The edges 66 serve as fulcrums and eventually the distortion becomes enough to lift the sealing edge 40 away from the wear surface 14 in the regions of the embossments 62 which permits the isolated region to be vented in essence through the pockets 60 (FIG. 15). After the pressure is relieved, the seal lip 32 returns to its original configuration in which the embossments 62 are spaced from the wear surface 14 and the sealing edge 40 contacts the wear surface 14 for its full circumference.

Still another modified seal unit G (FIGS. 16-19) obtains its elastohydrodynamic properties from sinusoidal or wave-like ribs 70 instead of from triangular configurations. The ribs 70 are located one after the other on the conical surface 38 and indeed project from that surface. Successive ribs 70 are spaced from each other, yet are parallel. Moreover, the leading rib 70, that is the one closest to the sealing edge 40, actually intersects the sealing edge 40 at equally spaced intervals along the edge 40 (FIG. 17). Thus, the portions of the leading rib 70 which converge toward the sealing edge 40 function as deflecting surfaces for directing the lubricant back to the sealing edge 40. The subsequent ribs 70, when the seal unit G is operating under normal conditions, that is without significant distortion in the seal lip 32, lie quite close to the cylindrical wear surface 14 of the cone 6.

Should the seal unit G experience an elevation in internal pressure, the seal lip 32 will bow inwardly in the region where it joins the case 20, and the second, or some of the succeeding lip, will contact the wear surface 14. Thereafter further deformation will cause the lip 32 to rock backwardly of the succeeding rib 70 and lift the sealing edge 40 away from the wear surface 14, at least at the area immediately ahead of the portion of the succeeding rib 70 about which the lip 32 pivots (FIGS. 18 and 19). In other words, portions of the succeeding rib 70 serve as fulcrums about which the seal lip 32 will pivot. In that instance, the pressure within the interior of the bearing B is relieved to the sides of the regions of contact between the succeeding rib and the wear surface 14, that is to the sides of the fulcrum points.

Self-venting characteristics may be imparted to a seal unit H (FIGS. 20 and 21) having a plain lip seal 32, this exists in the complete absence of elastohydrodynamic pumping elements. In that case, the seal lip 32 has buttons 74 projecting from its conical surface 38, but the buttons 74 in contrast to elastohydrodynamic sealing elements are spaced from the sealing edge 40. During normal operating conditions, the buttons 74 are located close to the wear surface 14, but do not actually touch that surface (FIG. 20). However, as the seal lip 32 distorts under increased pressure, the buttons 74 will come into contact with the wear surface 14 where they function as fulcrums (FIG. 21). Thus, any further increase in pressure causes the seal lip 32 to rock backwardly at the buttons 74 and as a result the portions of the sealing edge 40 that are located immediately ahead of the buttons 74 lift off of the wear surface 14, thereby venting the interior of the bearing B.

This invention is intended to cover all changes and modifications of the example of the invention herein chosen for purposes of the disclosure which do not constitute departures from the spirit and scope of the invention.

What is claimed is:

1. In combination with a circular wear surface, a seal unit for isolating a region behind the seal unit, said seal unit comprising: a mount spaced from the wear surface and an elastomeric seal lip of annular configuration attached to the mount and extended over the wear surface such that it can flex toward and away from the wear surface, the seal lip having a narrow sealing edge at which it normally contacts the wear surface, with the contact being continuous for the full circumference of the sealing edge, the lip further being capable of distorting toward the wear surface when the pressure within the region isolated by the seal unit is increased, and pivot means on the seal lip for contacting the wear surface when the seal is distorted by an increase in pressure within the isolated region, the distortion and contact being such that the seal lip pivots about the pivot means and lifts the sealing edge from the wear surface to vent the isolated region.

2. The combination according to claim 1 wherein the pivot means is an embossment that projects from the seal lip.

3. The combination according to claim 1 wherein the seal lip includes a pair of surfaces that converge toward the sealing edge, with one of the surfaces being presented toward the isolated region and the other away from the isolated region; wherein the surface that is presented away from the isolated region is conical and oblique to the wear surface; and wherein the pivot means are embossments that project from the conical surface that is presented away from the isolated region.

4. The combination according to claim 3 wherein the seal lip is attached to the mount in a region that is located beyond both the sealing edge and the pivot means, with the pivot means being interposed between the region of attachment and the sealing edge.

5. The combination according to claim 4 wherein the seal lip extends from the region of attachment to the mount generally parallel to the wear surface and has its greatest flexibility in the region of attachment.

6. The combination according to claim 3 wherein the embossments of the pivot means have deflecting surfaces along their sides, with the deflecting surfaces being presented obliquely to the sealing edge so as to pump lubricant that escapes past the sealing edge back toward the sealing edge.

7. The combination according to claim 6 wherein the embossments have bottom surfaces that merge into the sealing edge.

8. The combination according to claim 3 wherein the embossments of the pivot means have generally flat bottom surfaces that are located oblique to the wear surface, but the included angle between the bottom surfaces of the embossments and the wear surface is less than the included angle between the conical surface of the seal lip and the wear surface.

9. The combination according to claim 3 wherein the wear surface is cylindrical.

10. The combination according to claim 9 wherein the wear surface is on the thrust rib of a tapered roller bearing, the rollers of which are in the region isolated by the seal unit.

11. The combination according to claim 3 wherein the mount is a rigid seal case and the seal lip is bonded to the seal case.

12. In combination with a circular wear surface, a seal unit for isolating a region along the wear surface to prevent a lubricant from escaping from the isolated region and to prevent contaminants from entering the isolated region, said seal unit comprising: a rigid seal case that is presented outwardly from the wear surface; an elastomeric seal lip bonded to the seal case and extended along the wear surface in the general direction of the wear surface, the seal lip having a pair of conical surfaces that converge toward a sealing edge that normally contacts the wear surface for the full circumference of the sealing edge, whereby one of the conical surfaces is presented toward the isolated region and the other is presented away from the isolated region, the surface that is located away from the isolated region being generally between the region at which the seal lip is attached to the seal case and the sealing edge; and embossments projecting from the conical surface that is presented away from the isolated region and terminating close to the wear surface when the seal lip is in its normal operating configuration, the embossments being positioned such that when the pressure within the isolated region increases to distort the seal lip, the embossments will be pressed against the wear surface and will serve as fulcrums about which the seal lip will pivot sufficiently to lift the sealing edge away from the wear surface, whereby the isolated region is vented.

13. The combination according to claim 12 wherein the bottom surfaces of the embossments merge into the sealing edge.

14. The combination according to claim 13 wherein the embossments have side surfaces that are oblique to the sealing edge so as to pump lubrication that escapes from the sealing edge back toward the sealing edge.

15. The combination according to claim 12 wherein the embossments are spaced from the sealing edge.

16. The combination according to claim 12 wherein the cylindrical wear surface is on a bearing race.

* * * * *